US006765153B2

(12) United States Patent
Goodson

(10) Patent No.: US 6,765,153 B2
(45) Date of Patent: Jul. 20, 2004

(54) METHOD FOR MAKING IMPROVED CERAMIC CEMENT COMPOSITIONS CONTAINING A DISPERSED SEEDED PHASE AND A METHOD AND APPARATUS FOR PRODUCING SEED CRYSTALS

(76) Inventor: David M. Goodson, 313 W. Fourth St., Hinsdale, IL (US) 60521

( * ) Notice: Subject to any disclaimer, the term of this patent is extended or adjusted under 35 U.S.C. 154(b) by 270 days.

(21) Appl. No.: 09/881,509

(22) Filed: Jun. 14, 2001

(65) Prior Publication Data

US 2003/0005860 A1 Jan. 9, 2003

(51) Int. Cl.$^7$ .............................................. C30B 9/04
(52) U.S. Cl. ..................... 177/11; 117/68; 422/245.1
(58) Field of Search ........................... 117/11, 12, 18, 117/73, 74, 75, 76, 902; 114/931; 264/5, 13, 14

(56) References Cited

U.S. PATENT DOCUMENTS

| | | |
|---|---|---|
| 145,277 A | 12/1873 | Chrimes |
| 539,694 A | 5/1895 | Lytle |
| 1,087,098 A | 2/1914 | Aylsworth |
| 1,310,520 A | 7/1919 | Bennett |
| 1,468,930 A | 9/1923 | Sullivan |
| 1,782,460 A | 11/1930 | Carlson |
| 1,791,820 A | 2/1931 | Lindman |
| 1,819,018 A | 8/1931 | Eriksson |
| 1,829,381 A | 10/1931 | Walter |
| 2,023,001 A | 12/1935 | Billner |
| 2,058,984 A | 10/1936 | Hubbell ........................ 106/29 |
| 2,058,985 A | 10/1936 | Hubbell ........................ 106/29 |
| 2,081,802 A | 5/1937 | Eklund ......................... 25/155 |
| 2,111,517 A | 3/1938 | Vogel-Jorgensen ........... 106/25 |
| 2,241,604 A | 5/1941 | Knibbs et al. ................. 25/155 |
| 2,279,262 A | 4/1942 | Edwards ....................... 106/95 |
| 2,307,629 A | 1/1943 | MacIldowle ................ 117/123 |
| 2,910,372 A | 10/1959 | Rushkin ........................ 106/89 |
| 2,987,406 A | 6/1961 | Minnick ........................ 106/97 |
| 2,987,407 A | 6/1961 | Ulfstedt et al. ................ 106/97 |
| 2,987,408 A | 6/1961 | Minnick ........................ 106/98 |
| 3,092,505 A | 6/1963 | Demaison ..................... 106/99 |
| 3,122,513 A | 2/1964 | Dempsey ..................... 252/478 |
| 3,600,207 A | 8/1971 | Bull ............................... 106/87 |
| 3,650,785 A | 3/1972 | Ball et al. ...................... 106/90 |
| 3,973,978 A | 8/1976 | Nakagawa et al. ........... 106/95 |
| 4,058,407 A | 11/1977 | Ray .............................. 106/92 |
| 4,082,563 A | 4/1978 | Ellis et al. ..................... 106/90 |
| 4,123,392 A | 10/1978 | Hall et al. ................... 252/478 |
| 4,192,690 A | 3/1980 | Meyer et al. ................. 106/99 |
| 4,261,756 A | 4/1981 | Bernstein ..................... 106/97 |
| 4,285,733 A | 8/1981 | Rosenberg et al. ........... 106/98 |
| 4,509,986 A | 4/1985 | Hooykaas ................... 106/110 |
| 4,584,327 A | 4/1986 | Sutton ......................... 523/130 |
| 4,666,521 A | 5/1987 | Colin ........................... 106/97 |
| 4,737,193 A | 4/1988 | Gutmann et al. ............. 106/88 |
| 4,773,934 A | 9/1988 | Colin ........................... 106/97 |
| 4,832,746 A | 5/1989 | Yachi et al. .................. 106/99 |
| 4,900,698 A | 2/1990 | Lundsager ................... 501/80 |
| 4,946,504 A | 8/1990 | Hodson ...................... 106/713 |
| 5,114,487 A | 5/1992 | Gartshore et al. .......... 106/695 |
| 5,192,366 A | 3/1993 | Nishioka et al. ............ 106/724 |
| 5,254,228 A | 10/1993 | Westhof et al. ............. 204/147 |
| 5,284,808 A | 2/1994 | Damiano et al. ........... 501/103 |
| 5,426,973 A | 6/1995 | Hartt ............................. 73/86 |

(List continued on next page.)

*Primary Examiner*—Felisa Hiteshew
(74) *Attorney, Agent, or Firm*—C. John Brannon; Bingham McHale LLP

(57) ABSTRACT

A method of controlling the physical properties of cement by adding a predetermined amount of a second phase to a first phase cementitious precursor. The second phase is added in the form of seed crystals having controlled sizes, shapes, and compositions. The seed crystals provide growth sites upon curing the cement for a second phase in the cement body. The curing is accelerated by the presence of the seed crystals. Control of the microstructure of the resulting cement body through controlled distribution and growth of the seed crystals enables the formation of a cement body having precisely controlled physical properties.

45 Claims, 4 Drawing Sheets

U.S. PATENT DOCUMENTS

| | | | |
|---|---|---|---|
| 5,523,150 A | 6/1996 | Numata et al. | 428/307.7 |
| 5,527,387 A | 6/1996 | Andersen et al. | 106/693 |
| 5,538,552 A | 7/1996 | Osing et al. | 106/97 |
| 5,569,325 A * | 10/1996 | Barclay et al. | 117/18 |
| 5,626,664 A | 5/1997 | Osing et al. | 106/697 |
| 5,641,584 A | 6/1997 | Andersen et al. | 428/703 |
| 5,678,165 A | 10/1997 | Wu | 419/37 |
| 5,783,295 A | 7/1998 | Barnett et al. | 428/216 |
| 5,879,722 A | 3/1999 | Andersen et al. | 425/250 |
| 6,106,614 A * | 8/2000 | Stephens et al. | 117/73 |
| 6,120,602 A * | 9/2000 | Stephens et al. | 117/200 |

* cited by examiner

METHOD FOR MAKING IMPROVED CERAMIC CEMENT COMPOSITIONS CONTAINING A DISPERSED SEEDED PHASE AND A METHOD AND APPARATUS FOR PRODUCING SEED CRYSTALS

TECHNICAL FIELD OF THE INVENTION

The present invention relates generally to the field of ceramics, and more specifically to a cementitious composition containing a dispersed seeded phase and a method and apparatus for producing seed crystals.

BACKGROUND OF THE INVENTION

Concrete is one of the most ubiquitous of all structural materials, consisting generally of aggregates, such as rock or gravel, bound together in a cement matrix. While the aggregate phase comprises about 80% of the volume of the concrete, it is the cement binder phase that is most important regarding the physical properties and ultimate performance of the concrete.

There is a wide variety of different cements, including organic polymer cements, amorphous cements, and ceramic cement compositions. Ceramic cements are generally mixtures of water and reactive metal oxides that undergo chemical reactions causing them to harden and fasten after they are mixed and allowed to set. In addition to providing the binding matrix for concrete, cements have a variety of familiar uses, such as glues or adhesives for bonding porous materials, providing the bonding layer that holds bricks together to form walls, and as structural building materials such as patio or garage slabs. The cement of choice for the majority of commercial uses is Portland cement, a mixture of water and calcined lime (CaO) and silica ($SiO_2$)-containing minerals. Upon curing, the primary constituents of Portland cement are dicalcium silicate ($2CaO \cdot SiO_2$), tricalcium silicate ($3CaO \cdot SiO_2$), and tricalcium aluminate ($3CaO \cdot Al_2O_3$) phases and a ferrite phase containing calcia (CaO) and alumina ($Al_2O_3$). In commercial Portland cement, none of these phases are chemically pure; rather, they are solid solutions with such impurities as Mg and Al dispersed throughout.

Portland cement has the commercial advantage of being relatively cheap to produce and easy to mix and pour. Part of the reason Portland cement is so cheap is because the silica-containing mineral component may come from a wide variety of sources, usually silica-containing clays, and also because these clays are not required to be especially pure or consistent.

Portland cement also suffers from some disadvantages, with inconsistency of the physical properties of the cement being chief among them. The inconsistencies arise from the inherent inconsistency of the source materials, both in composition and quality. Typically, the raw constituents of Portland cement are ground clinkers containing hydraulic calcium silicates of varying compositions, calcium sulfates, and also various aluminates, manganates, and other impurities present in varying and uncontrolled amounts. Moreover, there is no real control of the grinding process, yielding cement powders with extremely variable particle size distributions (PSDs). The lack of consistency of the compositions and PSDs of the raw materials relates directly to a lack of consistency in the physical properties of the resultant Portland cement.

Portland cement also has the disadvantage of having a relatively high viscosity. While it is well adapted to pouring and spreading, Portland cement is too thick for most pumping and/or spraying operations. Another disadvantage of Portland cement is that it does not readily bond to itself. Portland cement-containing structures, such as cement driveways or road segments, must be formed in essentially one step. If there is an interruption in the forming of a Portland cement body sufficient to allow the cement to begin to cure, a structural discontinuity or "cold joint" can result. Moreover, Portland cement cannot be used to patch a Portland cement structure absent costly and time consuming surface pre-treatment at the patch interface.

Portland cement also has the limitation of having a slow setting or "drying" time, during which the cement remains plastic and may be easily deformed. While the cement sets up and hardens, it is subject to damage and deformation by vandals, animals, and the elements; moreover, until the cement hardens it cannot support a load and in fact must itself be supported. This results in a potentially costly "sit and wait" period during which further construction depending on the structural strength of the freshly poured cement form is necessarily suspended.

Another important limitation of Portland cement is that it is relatively soft, and is therefore not suited for those applications requiring a very hard surface, body, or bond. Portland cement also has limited toughness, relatively low tensile and fracture strength, and is relatively quickly worn down. Portland cement is also fairly porous and permeable to liquids, and thus quickly suffers from the deleterious effects of water intrusion and chemical degradation, such as from entrapped water expanding upon freezing and from seasonal exposure to de-icing salts.

There are other ceramic cements available that are tougher, harder, stronger, less porous, and/or chemically more stabile. For example, phosphate cements, resin-modified cements, and carbon-fiber composite cements are all harder and tougher than Portland cement. These cements also have the advantages of having more consistent and reliable physical properties. However, these cements have the disadvantages of being much more expensive and in much shorter supply than Portland cement. Hence, there is a need for a method of controlling the consistency of the physical properties of Portland cement and for altering the physical properties as desired. The present invention is directed at satisfying this need.

SUMMARY OF THE INVENTION

One form of the present invention contemplates controlling the physical properties of cement by adding a predetermined amount of a second phase to the cementitious precursor. The second phase is added in the form of seed crystals having controlled sizes, shapes, and compositions. Upon curing, the seed crystals provide growth sites for a second phase in the cement body. Curing is accelerated by the presence of the seed crystals. Control of the physical properties of the resultant cement is achieved by controlling its microstructure through the morphology, orientation, distribution and growth of the seed crystals.

One object of the present invention is to provide an improved method of producing a cement.

Another object of the present invention is to provide an improved method of producing small spherical particles via precipitating them in a drop-tube.

Still another object of the present invention is to provide an improved method of producing fine catalyst particles having high surface-area-to-volume ratios.

Yet another object of the present invention is to provide an improved method of coating particles and of making compounds and/or composites from precursors. Related objects and advantages of the present invention will be apparent from the following description.

DETAILED DESCRIPTION OF THE PREFERRED EMBODIMENT

Figure 1A:
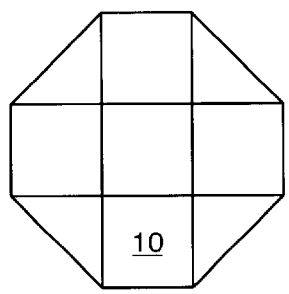
FIG. 1A is a front elevational view of a typical seed precursor of a first embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The physical properties of cements, including compressive strength, hardness, toughness, porosity, tensile strength, water resistance, and chemical stability are dependent on the cement's microstructure. As used herein, the microstructure of a cement or cementitious material is defined to be a measure of the composition, distribution, size, and size distribution of its component phases and their boundaries. Additives and/or admixtures have been used in the past to control various cement properties. For example, U.S. Pat. No. 1,310,520 to Bennett discloses the addition of copper stamp sand to harden Portland cement; U.S. Pat. No. 4,832,746 discloses the additions of metal fibers to Portland cement and other cements to increase their structural strengths; and U.S. Pat. No. 5,527,387 discloses the addition of fly ash and/or silica fume to decrease the amount of water required to produce a workable cementitious mixture and to increase the strength of the cement. However, while the use of cement additives is not new, additives have primarily been used to provide an additional stable phase or composite component to the cement that does not change or grow as the cement cures.

The present invention is directed towards the controlled distribution in ceramic precursors of seed crystal additives of predetermined size, shape, hardness, and PSD to control the microstructure and final physical properties of the ceramic body. The seed crystals provide growth sites upon which one or more distributed crystalline phases may grow while the cement cures. The addition of one or more controlled crystal phase to a ceramic body results in a tailored and controlled microstructure, which in turn gives rise to ceramic bodies having consistent, controlled and reliable physical properties that may be enhanced and tailored to suit a particular need.

There are two ways in which kinetics may be used to control the microstructure of a polycrystalline material, by controlling the nucleation kinetics of the individual crystals and/or by controlling the growth kinetics of already nucleated crystals. The ranges of physical conditions under which crystals nucleate and grow often have little or no common overlap. Therefore, sometimes during processing a material moves through the crystal growth regime for a given type of crystal before any crystals nucleate. Seed crystals may be used to provide controlled distribution of already nucleated crystals that may grow while the material is in the growth regime.

Likewise, nucleation agents may be introduced that act as catalysts upon which crystals may nucleate under conditions that are otherwise unfavorable for nucleation (i.e., while the material is in the growth regime but not in the nucleation regime). The nucleation agents do not have the same composition as the desired crystals, but may enable nucleation of those crystals under conditions wherein crystals could not otherwise spontaneously nucleate. Nucleation agents may also be used to provide controlled distribution of crystals that may grow while the material is still in the growth regime.

Figure 1B:
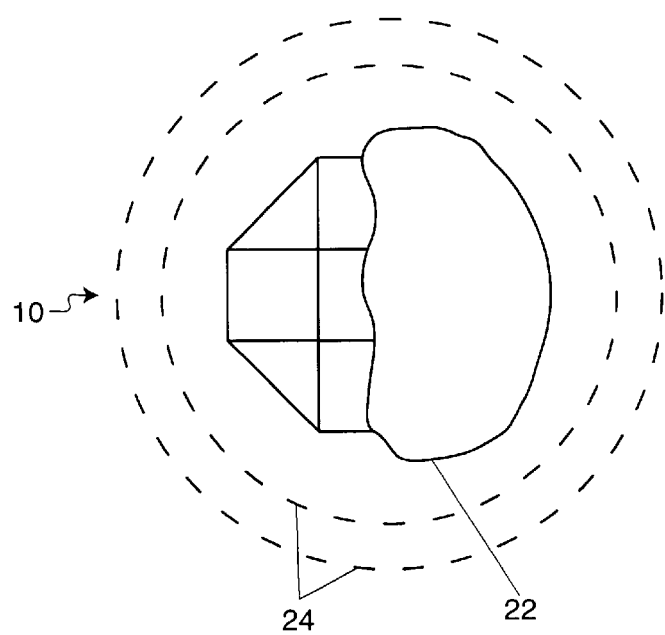
FIG. 1B is a front partial sectional view of a coated seed crystal of the embodiment of FIG. 1A.

One form of the present invention uses substantially spherical seed crystals of predetermined size, PSD, and composition to control the microstructure of a cementitious ceramic composition and to achieve a cement having a set of predetermined, microstructure-related physical properties. A typical seed crystal 10 is illustrated in FIGS. 1A and 1B. Preferably, the seed crystals 10 have tightly controlled PSDs and median sizes. The preferred median sizes range from a few nanometers to a few microns in diameter, depending on the compositions of the seeds 10 and of the cement, and also on their desired impact on the cement's physical properties and curing times.

The composition of the seeds 10 added to a given cement is a function of the desired property change they are to effect on the cement. Table I inexhaustively illustrates some of the desired physical effects and some of the seed compositions useful in achieving those effects in both Portland and phosphate cements. The contemplated phosphate cements include, but are not limited to, phosphates of calcium, magnesium, zinc, sodium, potassium, ammonia, and mixtures thereof.

TABLE 1

| Desired Effect | Portland Cement Seed Composition | Phosphate Cement Seed Composition |
| --- | --- | --- |
| Accelerators | NaCL, KCL, polyelectrolytes, acid or base coated or drop-tubed seeds, sodium aluminate, magnesium aluminate, wollastonite, Al (foil, powder), liquid phosphoric acid, flyashes under 10 microns in size, polyelectrolytes. | Uncalcined CaO or MgO and hyroxides thereof; polyelectrolytes, acid or base coated or drop-tubed seeds, volcanic ash, flyashes under 10 micros in size, polyelectrolytes |
| Hardeners | Ground blast furnace slag; CaCO3, MgAl-silicates; Catalyst seeds, Reactive seeds, feldspars, N and potassium silicates, agar, iron, iron oxide, metals, hard aggregates, silica fume, MetaMax, smaller cements, smaller seeds, smaller and harder aggregates, multiple sizes of particles, smaller particles sizes, fly ashes, silica fume, colloidal silica, fumed silica and silica flour | Ground blast furnace slag; CaCO3, Sn; MgAl-silicates; Catalyst seeds, Reactive seeds, feldspars, N and potassium silicates, agar, iron, iron oxide, metals, hard aggregates, silica fume, MetaMax, smaller cements, smaller seeds, smaller and harder aggregates, multiple sizes of particles, smaller particles sizes, fly ashes, silica fume, colloidal silica, fumed silica and silica flour, methyl methacrylates with initiators, dolomite, well graded and narrow gradient mixtures of flyashes or other silicas and oxides |
| Water Resistance | Sodium nitrate, agar, smaller particles sizes, fly ashes, silica fume, colloidal silica, fumed silica, silica flour | Plastics, agar, smaller particles sizes, fly ashes, silica fume, colloidal silica, fumed silica, silica flour, Na silicate, K silicate, Ductal |
| Chemical Resistance | Sodium nitrite, smaller particles sizes, fly ashes, silica fume, colloidal silica, fumed silica | Smaller particles, fly ashes, silica fume, colloidal silica, fumed silica |
| Retardation | Boric Acid, acetic acid, citric acid, borates, ammonium nitrate, strong water reducers, CMC's including carboxyl, methyl and ethyl, starch | Ammonium nitrate, ice water, dry ice, mixing in the acid and base ingredients separately in water, strong water reducers, Boric Acid, acetic acid, citric acid, borates, strong water reducers, CMC's including carboxyl, methyl and ethyl, starch, deionized water, large sized base oxides and hydroxides, gradient sizes of acid salts |
| Reduced rebound For sprayed cements | Saw dust, CMC's; water reducers, Na and K silicates, silica flour, CMC's (including carboxyl, methyl and ethyl). | Saw dust, CMC's; water reducers, Na and K silicates, silica flour, gums, guar, silica flour, k silicate |
| Increased ductile and fracture strengths and elasticity | Ground rubber crumbs, fibers, celluloses, CMC's, buytl methacrylates, elastomeric plastics, non-deforming plastics, smaller particle sizes, spherical particles, smaller and more spherical aggregates, latex, potassium silicate, sodium silicate, Ductal, water-activated polyurethanes and epoxies | Ground rubber crumbs, fibers, celluloses, CMC's, buytl methacrylates, elastomeric plastics, non-deforming plastics, smaller particle sizes, spherical particles, smaller and more spherical aggregates, latex, potassium silicate, sodium silicate, water-activated polyurethanes and epoxies |
| Less heat shrinkage | Agar; carboxyl methyl cellulose, celluloses, sawdust, curing compounds, guar, ethyl and methyl and carboxyl CMC's, starch, Berylex, starch | Agar; carboxyl methyl cellulose, celluloses, sawdust, curing compounds, Berylex, methyl and ethyl celluloses |
| Self-leveling Self-filling / Self-consolidating | Agar; carboxyl methyl cellulose,, ethyl and methyl CMC's, starch, Berylex, gums, smaller more spherical aggregates, cementious particles and no rocks, small sized flyashes and super plasticizers, micronized and amorphous silicas, and water reducers. Replacing sand and rock with spherical small sized flyashes and other micronized sililcas, feldspars, pre-wetting the aggregates, feldspars, K and Na silicates | Agar; carboxyl methyl cellulose, gums, smaller more spherical aggregates, cementious particles and no rocks, flyashes and super plasticizers and water reducers, higher pH for the mix, less reactive cementitious particles and aggregates, lower valence oxides, weaker acids, diluted acids, less active acid phosphate salts ex. K rather than ammonium or magnesium, separate mixing of the acid and base reactants and pre-wetting the aggregates, feldspars, K and Na silicates |

Generally, smaller seeds 10 are preferred since the smaller particles more readily fill the interstitial voids between the cement particles and result in more complete packing. As the cement powder is more completely packed, void space is reduced and the amount of water necessary for achieving workability is decreased. Reducing void space and excess water typically results in a cement with reduced porosity, increased compressive strength, a more even microstructure (more uniform phase domain size and distribution), and generally more uniform and consistent physical properties.

The shape of the seeds 10 is preferably at least substantially spherical. Spherical particles pack more readily and can more closely achieve theoretical packing density. Moreover, substantially spherical seeds 10 are preferred in order to produce an even growth of the seeded phase in the cement. Irregular seed particles 10 act as growth sites for crystallites having irregular morphologies, and oblong seeds 10 tend to grow oblong crystallites and/or whiskers. While these microstructural morphologies may be result in cement properties desirable for some special applications, they are generally undesirable.

The character of the seed surfaces is also important, affecting both the growth rate and morphology of the seeded crystallites as well as how the seeds mix into the cementitious precursor powder or slurry. One important characteristic of the seed surfaces is their hardness. Harder seeds 10 are preferred as they are more resistant to damage and deformation during mixing and blending with the cement. Seed hardness is even more critical if the blended cement is the bonding component of concrete, since the seeds 10 must resist additional grinding by the concrete aggregate media.

Another important characteristic of the seed surfaces is electrical charge. Seeds 10 having a net positive or negative charge will be less likely to agglomerate with each other and will more readily mix and become evenly distributed in the cementitious precursor. Charged seeds 10 may even be used to impart a net electrical charge to uncured, wet cements or mortar pastes, allowing for electrostatic manipulation of the flowable cement or mortar and electrostatic control over the adhesion of the cement, coating or mortar to a substrate.

Another important aspect of the seed surfaces is the presence of a thin coating layer 22, as illustrated in FIG. 2. The coating layer 22 may be as thin as a few atoms thick, and may do no more than provide the above-discussed surface charge. The surface coating layer 22 may also add to the hardness, toughness, and/or chemical stability of the seeds 10. For example, a relatively hard and substantially chemically inert aluminosilicate layer 22 may be deposited on a softer and more reactive phosphate cement seed crystal 10 to provide resistance to chemical and physical degradation during the mixing process.

If the surface layer 22 is made substantially thick, it can be considered to be a shell 24. One or more shells 24 may be formed about a seed core 10. Each shell 24 may have the same composition as the seed core 10 or they may have different compositions, as desired. This may be advantageous in applications requiring a delayed introduction of the seeds 10 into the cement growth medium. An outer, soluble shell 24 may be formed around the seed 10 with the thickness and dissolution rate of the shell 24 governing when the seed 10 is effectively introduced into the growth medium. Alternately, a relatively insoluble ablative shell 24 may be formed around the seed 10 such that the mixing action of the seed 10 in the cementitious or concretious medium releases the seed 10 at the desired time.

It is also possible to have some shells 24 carry one component of the seeded crystal phase with the other component supplied by the cementitious growth medium. The growth rate and morphology of the seeded phase may then be controlled by the amount of the essential growth component present in the shell 24.

Preferably, the seeds 10 are introduced as a dry additive to a cement powder and mixed until thoroughly dispersed. Alternately, the seeds 10 may be introduced as a dry powder into a cement slurry or as a seed slurry into a cement slurry. In the case of a sprayed cement, the seeds 10 may be mixed prior to spraying or may be introduced into the sprayed cement during the spraying process as an injected stream from a second sprayer or spray nozzle. In any embodiment, it is important that the seeds 10 be evenly distributed throughout the cement to yield a cement body having a uniform microstructure and accordingly uniform physical properties.

In addition to uniform seed distribution, some of the other factors affecting the physical properties of the seeded cement/cementitious body are the concentration of the seeds 10 in the cement, the relative compositions of the seeds 10 and of their cementitious growth medium, the amount of water present, the temperature at reaction or hydration time, the curing temperature, and the curing time. The seed crystals 10 are introduced as batches of seeds 10 having tightly controlled PSDs and median particle sizes ranging from a few nanometers to a few microns, and therefore a volume of seeds 10 equal to a small percentage (preferably about 0.01 to 5.0 percent) of the volume of cement powder contributes enough seeds 10 to control the microstructure of the resulting cement. Preferably, the seeds 10 are introduced with median sizes ranging from about 5 nanometers ($5 \times 10^{-9}$ meters) to about 20 microns ($20 \times 10^{-6}$-meters). As soon as seed crystals 10 are introduced into a cementitious growth medium (i.e., when the cement-seed powder mixture is hydrated, when the naked seeds 10 are mixed into hydrated cement, or when the protective shells 24 are removed from seeds 10 in a hydrated cement matrix) they begin to grow at a rate influenced by such factors as the composition of the seeds 10, the composition of the growth medium, the concentration of seeds 10 in the growth medium, and the temperature of the system.

In the case of Portland cement, most of the elements (usually cations) necessary for the growth of most of the seed crystal compositions are already available in the Portland cementitious growth medium; when seeding other cement compositions, it should be remembered that seeds 10 cannot grow if the necessary compositional elements are not present in the cement growth medium. If it is desired to seed and grow phases requiring elements not already present in the cement, those elements need to be added either as part of the seeds 10 (i.e., as shells 24) or as a separate component. Control of the above-discussed factors allows control of the microstructure of the final cementitious form and of its microstructure-dependent physical properties.

For example, to achieve accelerated curing or hardening of a cement, the seeding might be highly concentrated, the seeds 10 might be given a reactive surface treatment, the seeded phase composition might be chosen having fast reaction/growth kinetics, and/or the seeded phase might be chosen to remove impurities from the cement that would otherwise retard cement formation. To achieve increased strength, a medium concentration of seeds 10 might be used, the seeded phase composition might be chosen to have growth kinetics on a par with those of the cement, and/or the seeded phase might be chosen for having high strength properties which it would add as a dispersed composite phase. To achieve low porosity, a medium to low concentration of seeds might be used, the seeded phase composition might be chosen to have slow growth kinetics, and/or the composition of the seeds might be chosen to be the same as that of the cement. To increase the toughness of the cement, the seeded phase composition might be chosen to be the same as the cement or one that contributes an even microstructure with no secondary grain growth.

Figure 2A:
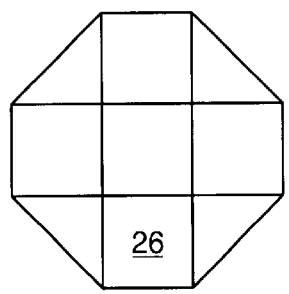
FIG. 2A is a front elevational view of a typical seed precursor of a second embodiment of the present invention.
Figure 2B:
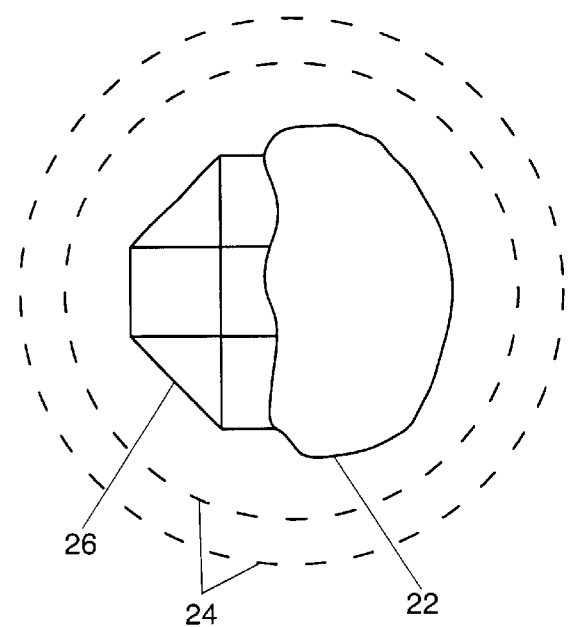
FIG. 2B is a front partial sectional view of a coated seed crystal of F IG. 2A.

Another form of the present invention, illustrated as FIGS. 2A and 2B, contemplates the use of batches of substantially spherical particles 26 having controlled PSDs as nucleation sites in cements to control the microstructure of the resulting cement body. In this embodiment, the nucleation control particles are preferably single crystals or polycrystalline particles having median sizes ranging from a few nanometers to a few microns in diameter. As with the seed crystals 10, the nucleation control particles 26 are introduced into the cement precursor and distributed substantially evenly throughout. Upon curing of the cement, the nucleation control particles 26 act as nucleation sites for one or more of the cement phases to promote controlled its controlled growth and distribution. Microstructure control is influenced by the concentration of the nucleation control particles 26 in the cement precursor, particle size, surface area, particle composition and particle shape.

Of particular importance is the particle composition. Since the nucleation control particles 26 are extremely small, the addition of nucleation control particles 26 equal to a small percentage of the volume or mass of the total cement powder (preferably about 0.1 to 5.0 percent by volume) is sufficient to provide enough nucleation sites to significantly control the resulting cement microstructure. The cement phase nucleated depends on the composition of the nucleation control particle 26 and the similarity of its crystal structure to that phase. For example, if the nucleation control particle 26 has a crystal structure similar to that of dicalcium silicate (i.e., is an isomer of dicalcium silicate), dicalcium silicate ($2CaO \cdot SiO_2$) will grow on the nucleation control particle 26 much more readily than the other cement phases. Likewise, some or all of the major phases may be nucleated by the controlled additions of different types of nucleation control particles 26 formulated to nucleate each different phase. Since the overall composition of the cement is not substantially changed by the addition of the nucleation control particles 26, controlled nucleation of one or more phases results in a cement having a microstructure wherein the individual crystallites or phase domains are smaller and more evenly distributed. This results in an increased phase boundary area relative to the phase domains, and contributes to the consistency of the physical properties of the cement. Moreover, smaller and more evenly distributed grains also generally contribute to increased strength, hardness, density, and toughness and decreased porosity.

Nucleation control particles 26 may also be used to disperse additives into the cementitious material. For example, the nucleation control particles 26 may include strength enhancing substances, such as plastics, elastomers, proteins, and the like that may be distributed to produce an non-brittle, compressible second phase in an otherwise brittle material to increase its toughness and fracture resistance. The nucleation control particles 26 may likewise contain mounts of water-activated polyurethanes, epoxies or other like materials for introduction into Portland or phosphate cements to decrease the curing time. The addition of such polymers also yields cements having decreased porosity and increased hardness. And heat resistance, hardness, and fracture strength may all be enhanced through the addition of particulate polyhedral oligomeric silsequioxanes.

A further example of the use of nucleation control particles 26 to enhance the performance of a cement is illustrated by the addition of one or more particulate potassium-containing materials (such as potassium hydroxide, potassium silicate, feldspar, or the like) to ammonium phosphate cement. The resulting, and still inexpensive, phosphate cement cures with increased smoothness, decreased pin-holing and pock marking, decreased evolution of ammonia gas during curing, and increased hardness. Likewise, less acidic phosphate salts may be added to further eliminate ammonia gas evolution and the accompanying pin-holing and strength loss. Moreover, the substitution of iron oxides, and/or less reactive $TiO_2$, $ZrO_2$ or the like for calcined MgO also works to improve the smoothness, hardness, and integrity of the cured phosphate cement.

In general, particulate ZrO may be added to a cement to impart or improve color. Silicates of K and Na may be added to impart a surface gloss, smoothness and hardness.

Figure 3:
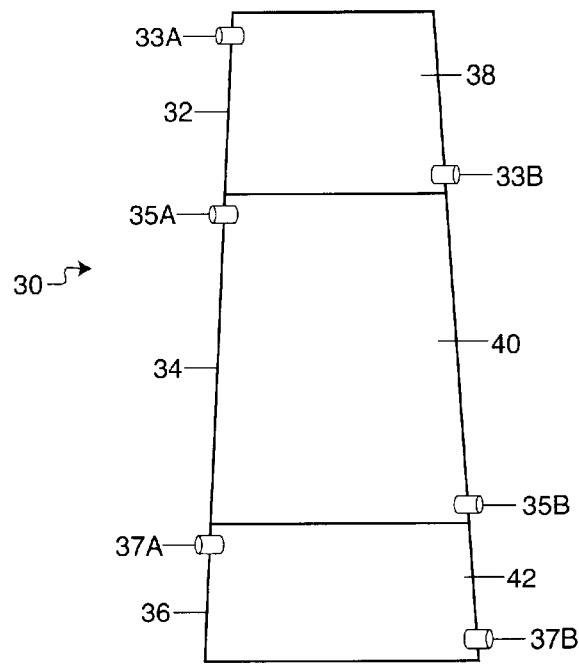
FIG. 3 is a perspective view of a multistage drop tube for producing cement additive powders according to a third embodiment of the present invention.

Seed crystals 10 and nucleation control particles 26 can be made by chemically treating relatively pure crystalline or polycrystalline powder precursors to produce substantially spherical particles falling into a predetermined PSD. FIG. 3 illustrates a preferred embodiment of a device for producing seed crystals 10 from powder precursors, nucleation control particles 26, drop tower or drop tube 30 through which the powder precursors fall under the pull of gravity. The drop tube 30 has a top portion 32, a middle portion 34, and a bottom portion 36 in fluid communication with each other. Each portion 32, 34, 36 is filled with a liquid chemical treatment through which the precursor powders sequentially fall or pass. Preferably, the composition, concentration, viscosity, turbulence, and temperature of each portion of the drop tube 30 may be individually controlled and maintained.

The composition of the powder precursor to be introduced into the drop tube 30 is predetermined according to the composition of the cement to which it is to be added and the desired effects it is to have on that cement's physical properties. While the powder precursor does not necessarily have to have the same composition as the desired seed crystal 10, it preferably should be able to support the growth of a layer of that crystalline composition. The powder precursor is preferably provided having a mean size and PSD close to the target mean size and PSD desired for the resultant seed crystal population. The powder precursor is then introduced into the top portion 32 of the drop tube 30. The powder precursors are preferably introduced into the center of the drop tube 30, since it is desirable to prevent them from making excessive contact with the walls of the drop tube 30 in order to better control the travel time of the powders through the tube 30, prevent uneven growth of the seed crystals 10 and prevent particle agglomeration. Moreover, it is preferred that the drop tube 30 be slightly conical in shape, flaring from top to bottom, to further prevent contact of the falling particles with the sides of the tube and to assist in minimizing the agglomeration of the seed particles at the bottom of the tube 30, note the seeds 10 may be continually removed.

The top portion 32 of the drop tube 30 preferably contains a first fluid 38. The first fluid 38 may be an etching solution used to further control the size and PSD of the introduced powder precursor. The etching solution also helps shape the seed crystals 10 by dissolving the outer surfaces of the powder precursors to achieve smaller and more perfectly spherical particles upon which the seed crystals 10 will grow. The etching process may also leave the etched particles with pH driven surface charges, enabling them to readily accept deposition of the seed crystal composition from solution. The etching solution is also preferably formulated to further purify the seed precursor powder by preferentially dissolving impurities introduced with the powder precursor. The composition of the etching solution may be dilute or concentrated acid or base, with the composition and concentration of the etchant tailored to the composition of the powder precursor and the desired effect it is to have thereon.

The rate at which the etching occurs is generally a function of temperature, insofar as the etching rate increases with increasing temperature and decreases with decreasing temperature. Therefore, the etching rate may be controlled by controlling the temperature of the etching solution. External means may be employed, such as surrounding the drop tube 30 with heaters and/or refrigerators. Internal means may likewise be employed, such as bubbling a temperature controlled inert or otherwise non-reactive gas through the etching solution 38, or by introducing an exothermic or endothermic chemical into the etchant (for example, ammonium nitrate to cool the etchant and other solutions or suspensions in the same or other layers of the tube or wash solution).

In some alternate embodiments, the fist fluid 38 is not an etching solution; instead the first fluid 38 is a wash bath. In other embodiments, the top portion 32 contains a first fluid etching solution 38 to which deflocculents, dispersants, sequestrants, plasticizers, defoamers, self-leveling agents, self-consolidating/filing agents, catalysts, water reducers, gases and/or surfactants have been added to prevent the precursor particles from agglomerating. In yet other embodiments, the top portion 32 contains a nutrient first fluid 38 from which the seed crystals 10 are grown. The first fluid 38 is normally envisioned as an aqueous solution, but may be any solution conducive to the growth of a given crystal, such as an organic liquid or a gas. In still other alternate embodiments, the top portion 32 of the drop tube 30 contains inlet and outlet valves 33A, B through which etchant fluid is continually flowed to maintain a constant pH/chemical concentration.

The middle portion 34 of the drop tube 30 preferably contains a second fluid 40 which is more preferably the nutrient bath from which the seed crystals 10 are grown. The composition and concentration of the nutrient bath is selected to grow seed crystals 10 of the desired composition on the precursor particles passing through the middle portion 34 of the drop tube 30, and may contain the growth medium in solution, as a colloidal suspension, a gas, or in any other convenient chemical medium. The growth rate of the seed crystals 10 is influenced by the concentration, turbulence (stirring), pH, and temperature of the nutrient bath and the time the growing crystals spend in the second nutrient fluid growth medium 40. For most seed crystals 10, a pH range between about 5.5 and about 8.0 is preferred. These factors can be controlled to allow the even, steady growth of substantially spherical seed crystals 10 of the desired size in the nutrient bath. While substantially spherical seed crystals 10 are preferred for most uses, some crystal morphologies tend away from the spherical and toward the cubic. However, the above-detailed processing parameters influencing crystal growth rate may still be used to produce uniformly sized and substantially perfectly shaped non-spherical crystals. Control of the growth rate is not only important as a tool for assuring the proper seed crystal size and PSD, but is also important because crystals grown at a slow and even rate tend to have less defects and more prefect shapes than those grown at fast and/or uneven rates. The temperature of the nutrient bath may be easily controlled using any of the methods described above regarding the temperature control of the etching solution.

In some alternate embodiments, the middle portion 34 of the drop tube 30 contains inlet and outlet valves 35A, B through which the second fluid nutrient solution 40 is continually flowed to maintain a constant concentration. In other embodiments, the middle portion 34 contains deflocculents, dispersants, sequestrants, plasticizers, water reducers, defoamers, self-leveling agents, self-consolidating/filling agents and/or surfactants, cooling chemicals or gas(es), added to the nutrient solution to prevent the growing seed crystal particles 10 from agglomerating and to help maintain the desired small crystal size and spherical crystal shape.

The bottom portion 36 of the drop tube 30 preferably contains a wash bath 42. Preferably, the wash bath 42 is composed of cool or chilled deionized water. The seed crystals 10 passing through the wash bath 42 are rinsed of the nutrient solution to prevent further, uncontrolled growth. The lower temperature of the wash bath 42 relative to the nutrient solution also helps to prevent further crystal growth.

In some alternate embodiments, the wash bath 42 is not cooled. In other alternate embodiments, the wash bath 42 is composed of water. In still other alternate embodiments, the wash bath 42 is pH controlled to neutralize the pH of the crystals passing through the acidic or alkaline etch and/or nutrient solutions. In yet other embodiments, the bottom portion 36 of the drop tube 30 contains inlet and outlet valves 37A,B and the wash bath 42 is flowing. In still other embodiments, the seed crystals are maintained in the wash bath for extended lengths of time, or until they are used. In yet other alternate embodiments, an electric field may be generated in the drop tube to impart a net surface charge or to preferentially orient and/or segregate forming seeds (see FIG. 5).

After the seed crystals pass through the wash bath 42, they are dried and collected. The crystals 10 exiting the drop tube 30 are preferably of the desired size, shape, and PSD for immediate use, although they may be sieved or otherwise sized if so desired.

Figure 4:
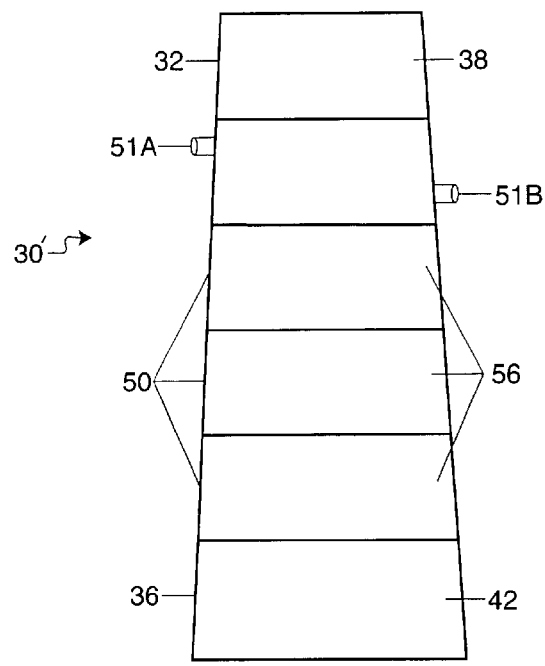
FIG. 4 is a perspective view of a multistage drop tube for producing cement additive powders having a plurality of intermediate segments according to a fourth embodiment of the present invention.

In one alternative embodiment, illustrated as FIG. 4, the drop tube 30' contains one or more intermediate portions 50 between the top portion 32 and the bottom portion 36. Each intermediate portion 50 preferably contains a separate nutrient solution, the composition and concentration of which is individually controlled, such as through the use of inlet and outlet valves 51A,B. Crystals passing through an intermediate portion 50 of the tube 30' acquire a layer or shell 24 having a different chemical and/or physical composition. By passing the growing seed 10 through several different intermediate portions 50, several shells 24 of different compositions may be built up on the seed 10 to produce a layered polycrystalline or composite seed 10.

Figure 5:
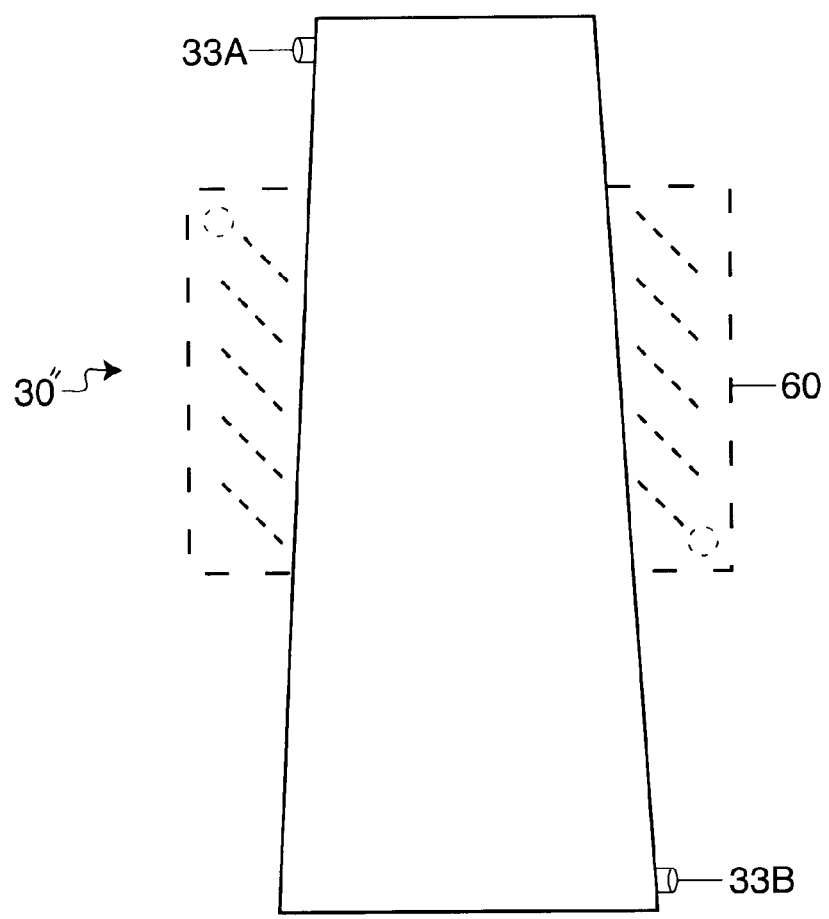
FIG. 5 is a perspective view of a single-stage drop tube according to a fifth embodiment of the present invention.

In yet another alternate embodiment, shown as FIG. 5, the drop tube 30" comprises a single stage containing a single solution bath containing at least one nutrient fluid 56. The seed precursors are passed through the bath and are grown in transit. Removal from the nutrient fluid 56 halts the growth of the seed crystals 10.

The drop tube environment of any embodiment may also be manipulated to impart other desired properties onto the particles processed therein. For example, electric field coils 60 may be positioned to generate an electric field extended through the drop tube 30 to impart a net charge onto the particles processed therein, as shown by ghost lines in FIG. 5, for example. Such an imparted charge discourages agglomeration (since like charges repel) and is also useful in evenly distributing the seeds 10 evenly throughout a cementitious powder or slurry. Further, if the particles 10, 26 are sufficiently charged and/or a great enough concentration of charged particles are added to a cementitious material, the disposition of the cementitious material may be aided through the application of like or unlike fields to direct the flow of the cementitious material and/or to influence the adhesion of the cementitious material onto a given substrate. Such a control process enjoys the advantages of being quick and efficient with reduced waste and clean-up time requirements. This is especially true in the case of phosphate cements, since phosphate cements are highly reactive and set and cure rapidly. This technique can be adapted to the process of tuckpointing in the form of a mortar gun (or spray gun). The use of a mortar gun would greatly speed and greatly reduce the expense of tuckpointing, which is currently done by hand with a trowel and pallet.

The drop tube 30 may also be used to produce coatings 22 of controlled, substantially uniform thickness on the seed particles 10 nucleation control particles 26, or other larger objects passing therethrough. For instance, transparent coatings of magnesium phosphate may be applied by adding nanosize precursors of magnesium oxide into an aqueous phosphoric acid solution. A magnesium phosphate coating is resultingly formed on seeds 10 or other objects passing therethrough. The thickness of the coating 22 is a function of the time the coated object spends in the solution and the concentration of the solution. Interestingly, the magnesium phosphate coating tends to be transparent rather than opaque when the MgO precursors are nanosized.

Tables 2–4 below illustrate general examples of four different types of seeds 10 (Types I–III) made from the above-described process. Each type of seed 10 is made through its own general processing parameters and has its own set of identifying properties. While the above-described process is not limited to making seeds 10 falling into one of the four types described in the following tables, the mechanism of defining four distinct seed types is instructive of the versatility of the process as well as convenient for describing four varied and useful classes of cementitious seeds, reactive seeds and catalysts.

TABLE 2

TYPE I: Seeds for all Portland cements/mortars/concretes and coatings

| PRECURSOR(S) | SOLUTION / COLL. SUSPEN. CONTENTS | RESULTANT SEEDS | PROPERTIES OF HARDENED SEEDED CEMENTS / COATINGS / CHEM. COMPOUNDS. |
|---|---|---|---|
| HES-OPC = High Early Strength Portland cement. Precursor sizes = preferably nano or micron size although larger sizes can be used in baths or the drop-tube, preferably the drop-tube. | "WS" = water & silica: (fumed silica &/or colloidal &/or silica fume &/or silica flour &/or small sized flyash = 20 micron and smaller) and optionally: a sequestrant &/or surfactants / water reducers &/or retardants or accelerants &/or super plasticizers (prefer-ably a 3$^{rd}$ or 4$^{th}$ generation super plasticizer). Colloidal tin, potassium or sodium feldspars and K or Na silicates, carbonates and other materials. Ground blast furnace slag or iron oxide(s), iron oxide and other magnetic materials and polyelectrolytes and other materials/metals/compounds, chemicals. Using sequestrants such as: DEQUEST 2000 ™, DEQUEST 2006 ™ and colostrum. | "SSS" = Small Spherical Seeds, of Portland Cement consisting of: Hydrated cement particles or clusters consisting mostly of bi- and tri-Ca silicates with some Fe and AL silicates. The colloidal silica, fumed silica, silica fume and smaller sized fly ashes react much more quickly with the CaOH, than does sand and yields a spherical shaped seed in the drop-tube, and a somewhat spherical shape when just bathed in the nutrient solution. Seeds charged with a positive or negative electrical charge or having a magnetic field or having ferromagnetic or paramagnetic character. | "OPC-P" = Accelerated set times, more compressive, fracture, tensile and flexibility / ductile strengths, smoother, easier to finish. Less total porosity and smaller pore size, increased self-leveling and self-filling/consolidating properties. When used in OPC or HES-OPC. Smaller particles also yield greater adhesion to substrates and to itself and other cement types, it makes the resultant product easier to spray, less porous and more dense. Resulting in end products = more self-leveling and self-filling and able to have an electrical and/or magnetic charge or being conductive. Can be used in electrostatic sprays. |
| OPC (Ordinary Portland Cement) | WS & chilled water or ammonium nitrate (for cooling) or cooling gas added | SSS with even smaller particle sizes. | "OPC-P" |
| OPC | WS & CO2 or CaCO3 or SN or Ground blast furnace slag or iron oxide(s) or SiC or flyash combinations thereof. | SSS | OPC-P" |

TABLE 3

TYPE II: Seeds for phosphate cements/mortars/concretes/coatings

| PRECURSOR(S) | SOLUTION / COLL. SUSPEN. CONTENTS | RESULTANT SEEDS | PROPERTIES OF HARDENED SEEDED CEMENTS / COATINGS / CHEM. COMPOUNDS |
|---|---|---|---|
| Calcined MgO or CaO or ZrO or NI or Mb or Cr or Al or Ca or Mg oxides and hydroxides thereof and combinations thereof also ground iron ore trap rock (which contain a mixture of hard metal oxides such as vanadium) and | "PCS"= Ammonium phosphate salt(s) and/or alkaline earth phosphate salts (or phosphoric or phosphoric acids) or Zn or Al or Na phosphate salts, or combinations thereof, and optionally along with water & silica: (fumed silica &/or colloidal &/or silica fume &/or flour | "SPS" = Small Spherical Phosphate Seeds of: Nano or micron sized particles or clusters of: chemically bonded reactive powder cement consisting of: ammonium and/or alkaline earth phosphate salts (or phosphoric or phosphoric acids). Mortars, coatings, | "PC-PROP" = PC Properties. Accelerated set times, more compressive, fracture, tensile and flexibility strengths, smoother, easier to finish, less total porosity and smaller pore size, increased self-leveling and self-filling properties. |

TABLE 3-continued

TYPE II: Seeds for phosphate cements/mortars/concretes/coatings

| PRECURSOR(S) | SOLUTION / COLL. SUSPEN. CONTENTS | RESULTANT SEEDS | PROPERTIES OF HARDENED SEEDED CEMENTS / COATINGS / CHEM. COMPOUNDS |
|---|---|---|---|
| ground blast furnace slag. Precursor sizes = preferably nano- or micron- size although larger sized particles and clusters can be used in baths or the drop-tube, preferably the drop-tube. Also particles of flyash and volcanic ash smaller than 70 microns, including nanosized particles and Boral's M3 ™ = 3 micron sized classified flyash. | &/or flyash) and optionally a sequestrant &/or surfactants / water reducers or retardants or accelerants. Also one can add in super plasticizers (prefer-ably a $3^{rd}$ or $4^{th}$ generation super plasticizer) and/or a defoamer and/or potassium or sodium feldspars an/or K or Na silicates and/or colloidal tin and/or Ground blast furnace slag or iron oxide(s) and other magnetic materials, polyelectrolytes, and other materials/metals/compounds, chemicals. Using sequestrants such as; DEQUEST 2000 ™, DEQUEST 2006 ™ and colostrum. | concretes and paints. Nano and micron size particles and clusters, Seeds charged with a positive or negative electrical charge or having a magnetic field. | Smaller particles also yield greater adhesion to substrates and to itself and other cement types, it makes the resultant product easier to spray, less porous and more dense. These phosphate cement seeds along with the catalysts and reactive seeds can be used in plastics as fillers and as reactive fillers which result in plastics that have more compression, fracture strengths and are more resistant to heat - which greatly increases both the number of uses for and the economic value of plastics. Can use electrical and magnetic properties to make tunable and electrically and magnetically tunable materials and can orient crystals also. Resulting in end products = more self-leveling and self-filling and able to have an electrical and/or magnetic charge being electrically or magnetically conductive. Can be used in electrostatic sprays. |
| Can use electrical and magnetic properties to make tunable and electrically and magnetically tunable materials and can also orient crystals also. | PCS & chilled water or ammonium nitrate or cooling gas added. | SCS with even smaller particle sizes. | Increased PC-PROP properties. |

TABLE 4

TYPE 3: Seeds for Catalysts and reactive compounds.

| PRECURSOR(S) | SOLUTION / COLL. SUSPEN. CONTENTS | RESULTANT SEEDS | PROPERTIES OF HARDENED SEEDED CEMENTS / COATINGS / CHEM. COMPOUNDS |
|---|---|---|---|
| Precursor sizes = nano or micron sized although they can be larger particles or clusters. In the first case = OPC seeds or PC seeds. | "WSK" = "WS" & the following ingredients or combinations thereof: Pt, palladium, strong acids or strong bases and optionally: (fumed silica &/or colloidal &/or silica fume &/or flour) and sequestrant &/or | "KAT" = Small catalytic seeds of: Nano or micron sized particles or clusters of: carriers / support & catalysts such as activated OPC seeds or PC seeds or flyash seeds or volcanic ash seeds. | Catalysts on a carrier/support and reactive seeds. Including sold base and solid acid catalysts. Initiators. Catalytic supports / carriers. |

TABLE 4-continued

TYPE 3: Seeds for Catalysts and reactive compounds.

| PRECURSOR(S) | SOLUTION / COLL. SUSPEN. CONTENTS | RESULTANT SEEDS | PROPERTIES OF HARDENED SEEDED CEMENTS / COATINGS / CHEM. COMPOUNDS |
|---|---|---|---|
| | surfactants / water reducers or retardants or retardants or accelerants. Micron and nanosized metals for hardness and as an ingredient in organic initiators. Strong bases such as: KOH &/or NaOH is added to the solution / colloidal suspension in the drop tube. Or alternatively for an acid catalyst: strong Phosphoric, nitric or hydrochloric acids are used. Also oxygen and oxidizers and fuels to make reactive seeds/ catalysts for explosives and fuels. Using sequestrants such as: DEQUEST 2000 ™, DEQUEST 2006 ™ and colostrum. | Also zeolite carriers drop-tube coated with activates such as NaOH or KOH or CaOH or Pt or Pd. Nano and micron size particles and clusters. | |
| K-PRE and Zeolite, or small particles of volcanic ash such as Mt. St. Helens volcanic ash or 20 micron or smaller sized flyash | WSK & chilled water or ammonium nitrate or cooling gas added. Reactive and/or inert gasses. | KAT with even smaller particle sizes and more surface area. | More active catalysts. |

Regarding Type I seeds, when OPC precursor particles are passed through a drop tube containing water, the resultant seeds 10 are fully wetted spherical particles. Upon drying, the particles become fully hydrated OPC seeds 10 having high early strength (HES). If the OPC precursor particles are passed through a drop tube 30 containing a silica source, such as an aqueous suspension of colloidal silica, fumed silica, or silica fume, the resultingly formed OPC seeds 10 are spherical and fully wetted.

Portland cement, concrete, and/or mortar having the above-described Type I seeds dispersed therein will develop a microstructure characterized by a reduced and uniform grain size and PSD, decreased porosity, and grains favoring a more spherical shape. Preferably, seeds 10 for Portland cements are prepared from seed precursors characterized as small grains of high early strength cement grown in a nutrient fluid selected such as deionized water preferably containing colloidal silica and/or one or more of the following: silica fume, silica flour, fumed silica, flyash. More preferably, the flyash is Boral's M3™, a 3 Micron sized classified flyash, which yields the advantage of a reduced water requirement and increased density through pore penetration and filling. The nutrient fluid may also preferably contain a third or fourth generation super plasticizer and optionally a sequestrant as well as a defoamer and an accelerant or retarder, as may be required. More preferably, the seeds 10 are treated to a second nutrient solution of 5% by weight aqueous KOH, 5% by weight aqueous NaOH or combinations thereof.

Regarding Type II seeds, the passage of micron or nanometer sized oxides or hydroxides of such cations as Mg, Al, Zr, Ca, Ni, Zn, K, Na or the like, whether calcined or uncalcined, through a drop tube 30 bath of aqueous phosphoric acid (or an aqueous phosphate salt solution) yields small, fully wetted generally spherical phosphate cement seeds 10. Upon drying, the seeds 10 are fully reacted seeds suitable for use as a dispersed phase in phosphate cements, concretes and/or mortars.

Dispersing the above-described phosphate cement seeds 10 in a phosphate cementitious material will, upon curing, yield a final cementitious material having rounder grains characterized by smaller and tighter PSDs and also having a generally decreased porosity. Preferably, seeds 10 for phosphate cements are prepared from seed precursors characterized as calcined MgO or oxides or hydroxides of iron, potassium, sodium, aluminum, zinc, zirconium, calcium, magnesium hydroxide or combinations thereof. The phosphate cement seeds 10 are preferably grown by treating the seed precursors in a nutrient fluid composition characterized as a substantially equal mixture, by volume, of concentrated phosphoric acid and aqueous solution or suspension of one or more of the following: colloidal silica, silica fume, silica flour, fumed silica, and flyash. Alternately, instead of concentrated phosphoric acid, the nutrient fluid may contain phosphoric acid of greater or lesser strength or may contain one or more of the following phosphate salts: potassium phosphate, calcium phosphate, magnesium phosphate, sodium phosphate, aluminum phosphate, zinc phosphate, and ammonium phosphate. The nutrient fluid may also contain a super plasticizer as well as a sequestrant (such as Monsanto's DEQUEST 2000™ or SOLUTIA™, as well as a defoamer, an accelerant and a retarder. More preferably, the seeds 10 are treated to a second nutrient solution of 5% by weight aqueous KOH, 5% by weight aqueous NaOH or combinations thereof.

Regarding Type III seeds, the passage of micron or nanometer size precursors of zeolites, fly ash or volcanic ash through a drop tube containing an aqueous solution of phosphoric acid or a phosphate salt of a cation such as Mg, Al, Zr, Ca, ammonium, or K will yield fine generally spherical fully wetted and reacted phosphate cement seeds 10. Drying the seeds 10 drives the reaction to completion, resulting in seeds 10 suitable for distribution in phosphate cement precursors. The seeds 10, once formed, may be exposed to phosphoric acid or hydroxides of potassium, sodium or ammonia to result in accelerators or catalysts for the growth of phosphate phases in cements, concretes and/or mortars. Alternately, the seeds 10 may be exposed to aluminum phosphate and/or a noble metal such as platinum or palladium to result in catalysts for the cracking of petroleum products. For example, seeds 10 made from zeolite or ash precursors may be wetted with an aluminum phosphate solution and then treated with a noble metal, such as platinum or palladium (preferably introduced as a relatively fine powder, such as by sprinkling or rolling onto the seeds) to produce seeds that may be used in the petroleum industry as fine, high surface-area-to-volume ratio catalysts for cracking or as catalytic media for the reduction of pollutive emissions from motor vehicle exhausts. Preferably, catalyst seeds 10 are formed from fine (smaller than about 50 micron in diameter) zeolite and/or calcined MgO or volcanic ash or ultrafine (less than 10 micron in diameter) fly ash. The catalyst seeds 10 are preferably grown from precursor stock in a nutrient fluid including water, a super plasticizer additive, and aluminum phosphate. The nutrient fluid may also contain one or more of the following additives as required: a sequestrant, a defoamer, a retardant, colostrum, and an accelerant. More preferably, the seeds 10 are treated to a second nutrient solution of between about 25% and 75% by weight aqueous KOH, 25% and 75% by weight aqueous NaOH or combinations thereof. Alternately, the second nutrient solution may contain from about 30% to about 75% by weight of one or more of the following acids: nitric, phosphoric, sulfuric, and hydrochloric.

The above-described drop tube 30 is not limited for use with oxide ceramics, but may also be used with metals, food, plastics, organics, hybrid-inorganic-organics, or any material for the coating 22 or reaction of particles of any size. For example, using the drop tube 30 for metal coating allows for the use of smaller size particles of precious/anti-corrosive/cosmetic metals, thereby enabling thinner coatings and reducing expenses. The use of smaller size particles allows for faster and more uniform meting and lower energy costs for refractory metals such as Mo and Cr. Smaller size particles for cosmetics, such as SiN for skin powders or TiO2 for skin whiteners allows for covering more surface areas with less material. Smaller size precursors or compounds or coatings thereon can change the optical, magnetic and other properties of the material to allow for broadened commercial utility. The drop tube 30 is further useful for tuning physical properties already present in a material or compound, such as for crystal or domain orientation.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of making microstructure control additives for a cement, comprising:
   a) providing a drop tower having an upper portion, a middle portion, and a lower portion in fluid communication;
   b) providing a top fluid in the top portion;
   c) providing a first nutrient fluid in the middle portion;
   d) providing a wash fluid in the lower portion
   e) introducing seed precursors into the top portion of the drop tower;
   f) passing seed precursors from the top portion through the tower into the bottom portion; and
   g) extracting starter seeds from the bottom portion.

2. The method of claim 1 further comprising the steps of:
   h) providing an etching fluid in the upper portion;
   i) etching the seed precursors in the upper portion; and
   j) passing substantially spherical etched precursors from the upper portion to the middle portion.

3. The method of claim 2 wherein the etch fluid is acidic.

4. The method of claim 3 wherein the seed crystals are acidic.

5. The method of claim 2 wherein the etch fluid is alkaline.

6. The method of claim 5 wherein the seed crystals are alkaline.

7. The method of claim 2 further comprising:
   p) growing nearly spherical seeds to sizes ranging from about 5 nanometers in diameter to about 20 microns in diameter.

8. The method of claim 2 further comprising the steps of:
   q) providing an interim drop tower portion between the middle portion and the bottom portion;
   r) filling the interim portion with a second nutrient fluid; and
   s) growing a second layer on the seed precursors passing through the interim portion.

9. The method of claim 8 wherein the second nutrient fluid includes at least one of the following compositions: 5% by weight aqueous KOH and 5% by weight aqueous NaOH.

10. The method of claim 8 wherein the second nutrient fluid includes at least one of the following compositions: 75% by weight aqueous KOH and 75% by weight aqueous NaOH.

11. The method of claim 8 wherein the second nutrient fluid includes between about 25% and 75% by weight aqueous KOH.

12. The method of claim 8 wherein the second nutrient fluid includes between about 25% and 75% by weight aqueous NaOH.

13. The method of claim 8 wherein the second nutrient fluid is a n acid solution of from about 30% to about 75% by weight of at least one of the following acids: nitric, phosphoric, sulfuric, and hydrochloric.

14. The method of claim 1 further comprising the steps of:
   k) stirring the first nutrient fluid to promote even crystal growth;
   l) maintaining a constant temperature of the first nutrient fluid to control the crystal growth rate; and
   m) maintaining a constant concentration of nutrient in the first nutrient fluid to control the crystal growth rate.

15. The method of claim 14 further comprising the step of:
   n) heating seed precursors to increase the crystal growth rate.

16. The method of claim 15 wherein the seed precursors are heated by controlled additions of an exothermic reactant to the first nutrient fluid.

17. The method of claim 14 further comprising the step of:
   o) cooling the seed precursors to decrease the crystal growth rate.

18. The method of claim 17 wherein the seed precursors are cooled by controlled additions of an endothermic reactant to the first nutrient fluid.

19. The method of claim 18 wherein the endothermic reactant is ammonium nitrate.

20. The method of claim 17 wherein the seed precursors are cooled by flowing an inert gas through the first nutrient fluid.

21. The method of claim 1 further comprising the steps of:
   t) providing seed precursors having particle sizes ranging from about 2 nanometers to about 10 microns; and
   u) extracting seeds having particle sizes ranging from about 5 nanometers to about 20 microns.

22. The method of claim 1:
   wherein the first nutrient fluid is chosen from the following compositions: water, distilled water, deionized water, aqueous NaOH solution, aqueous KOH solution, phosphoric acid, nitric acid, alkaline oxide, alkaline earth oxide, alkaline hydroxide, alkaline earth hydroxide, ammonium hydroxide, fly ash, and silica;
   wherein the seed precursors are chosen from the following compositions: Portland cement, flyash, volcanic ash, and zeolite; and
   wherein the wash fluid is chosen from the following compositions: water, deionized water, distilled water, and air.

23. The method of claim 1 wherein the seed precursors are small grains of high early strength cement and the first nutrient fluid compositions are chosen from an aqueous suspension of at least one of the following compositions: colloidal silica, silica fume, silica flour, fumed silica, and flyash.

24. The method of claim 23 wherein the first nutrient fluid also contains at least one of the following additives: a super plasticizer, a sequestrant, colostrom, a defoamer, an accelerant and a retarder.

25. The method of claim 1:
   wherein the seed precursors are chosen from the following compositions: calcined MgO, oxides or hydroxides of iron oxide, potassium oxide, sodium oxide, aluminum oxide, zinc oxide, zirconium oxide, calcium oxide, magnesium oxide, iron hydroxide, potassium hydroxide, sodium hydroxide, aluminum hydroxide, zinc hydroxide, zirconium hydroxide, calcium hydroxide, and magnesium hydroxide;
   wherein the first nutrient fluid is a combination of equal parts by volume of A and B;
   wherein A is includes an aqueous suspension of at least one of the following: colloidal silica, silica fume, silica flour, fumed silica, and flyash; and
   wherein B is includes at least one of the following: concentrated phosphoric acid, dilute phosphoric acid, aqueous potassium phosphate solution, aqueous calcium phosphate solution, aqueous magnesium phosphate, aqueous sodium phosphate, aqueous aluminum phosphate, aqueous zinc phosphate, and aqueous ammonium phosphate.

26. The method claim 25 wherein the first nutrient fluid also contains at least one of the following additives: a super plasticizer, a sequestrant, colostrom, a defoamer, an accelerant and a retarder.

27. The method of claim 1:
   wherein the seed precursors are chosen from at least one of the following compositions: zeolite, calcined MgO, volcanic ash, platinum, palladium and flyash; and
   wherein the nutrient fluid includes water, a super plasticizer, and aluminum phosphate.

28. The method of claim 27 wherein the nutrient fluid further includes at least one of the following additives: a super plasticizer, a sequestrant, colostrom, a defoamer, an accelerant and a retarder.

29. The method of claim 1 wherein the drop rate of the seed precursors is maintained between about 0.25 meters/second to about 1 meter/hour.

30. The method of claim 1 wherein the upper portion, the middle portion, and the bottom portion are coextensive and wherein the top fluid and the wash fluid are the first nutrient fluid.

31. The method of claim 1 further comprising the step of:
   v) imparting a net surface charge onto the seeds.

32. The method of claim 1 wherein the seeds are ferromagnetic.

33. A method of controlling the physical properties of cement, comprising:
   aa) providing a supply of nearly spherical seed crystals sized with a PSD ranging from about 2 nanometers to 10 microns;
   bb) providing a cement precursor with a majority of the cementitious particles having sizes in the PSD range from about 1 to 20 microns; and
   cc) mixing seed crystals into the cement powder to produce a seeded cement precursor with a by volume seed to cement precursor ratio of about 1:100.

34. The method of claim 33 further comprising the steps of:
   dd) hydrating the cement;
   ee) mixing the cement;
   ff) forming the cement into the desired shape; and
   gg) curing the cement;
   wherein the cement precursor is a powder.

35. The method of claim 33 wherein the cement precursor is a first slurry.

36. The method of claim 35 further comprising the steps of:
   hh) mixing the seed crystals into a second slurry; and
   ii) mixing the second slurry with the first slurry.

37. The method of claim 36 wherein the cement is formed into the desired shape by spraying.

38. The method of claim 33 wherein the seeds have a net surface charge and wherein the seeds are magnetically mixed into the cement powder.

39. The method of claim 33 wherein the seeds are paramagnetic and wherein the seeds are magnetically mixed into the cement powder.

40. A method of making seed additives for a cement, comprising:
   aaa) providing a drop tower;
   bbb) providing a nutrient solution at least partially filling the drop tower;
   ccc) providing a wash solution;
   ddd) passing seed precursors through the nutrient solution to form seeds; and
   eee) washing the seeds.

41. The method of claim 40 further comprising the steps of:
    fff) adding the seeds to a cement precursor;
    ggg) hydrating the cement precursor to form seeded cement;
    hhh) forming the seeded cement into a cement body; and
    iii) curing the cement body to grow a first cementitious phase with a second seeded phase dispersed therein.

42. A drop tower for making ceramic particulate compositions, comprising:
    a generally cylindrical upper portion;
    a generally cylindrical middle portion;
    a generally cylindrical lower portion; and
    nutrient fluid means for growing seed crystals contained in at least one portion;
    wherein the upper portion, the middle portion, and the lower portion are in fluid communication with each other.

43. The drop tower of claim 42, wherein the nutrient fluid means is contained in the middle portion and further comprising:
    a top fluid in the top portion; and
    a wash means contained in the lower portion.

44. The drop tower of claim 43 wherein the top portion contains a first nutrient fluid and wherein the middle portion contains a second nutrient fluid.

45. The drop tower of claim 42 further comprising electromagnetic means for generating an electromagnetic field within the drop tower.

* * * * *